Nov. 22, 1949     S. V. FORGUE     2,489,127
HIGH CAPACITANCE TARGET
Filed June 14, 1947
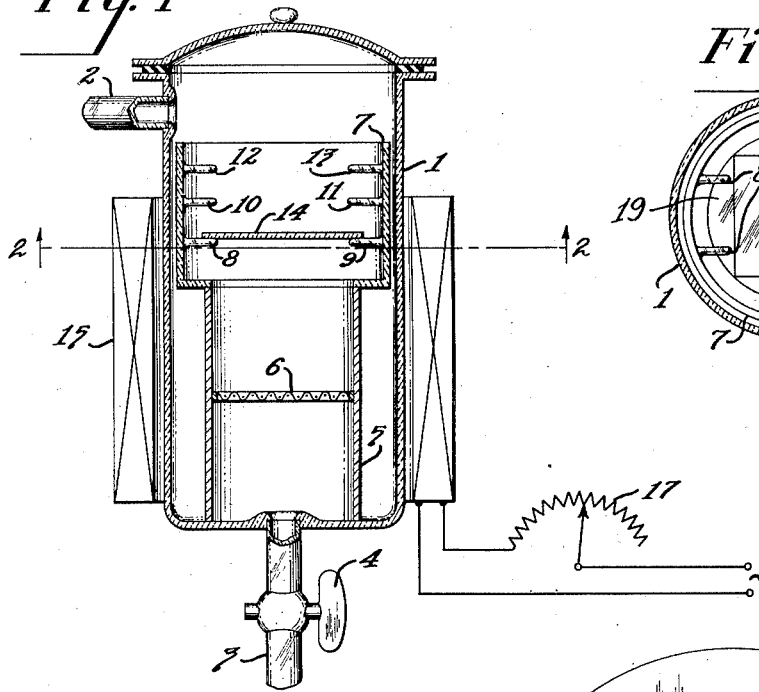
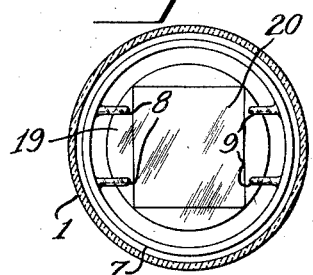
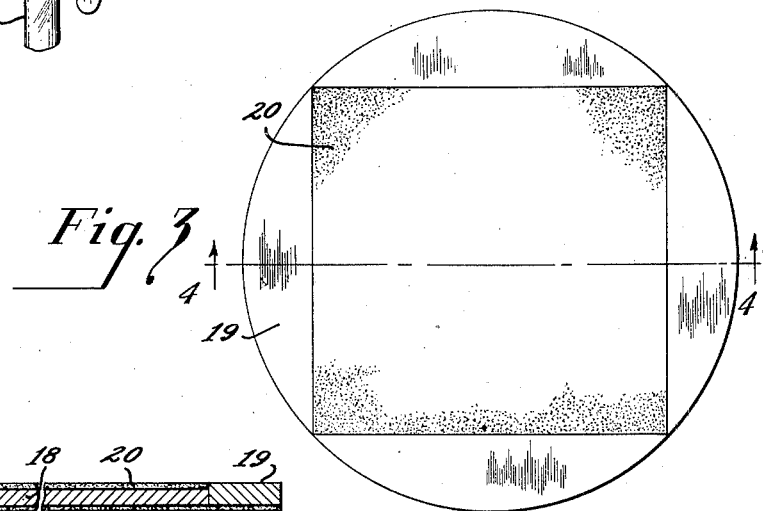
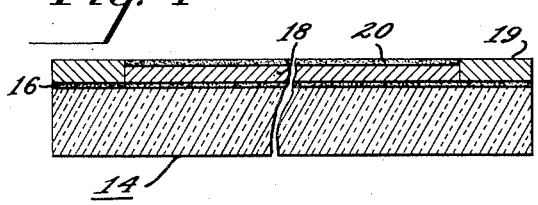
Inventor
Stanley V. Forgue
By William A. Zalesak
Attorney Patented Nov. 22, 1949

2,489,127

UNITED STATES PATENT OFFICE 2,489,127

HIGH CAPACITANCE TARGET

Stanley V. Forgue, Cranbury, N. J., assignor to Radio Corporation of America, a corporation of Delaware Application June 14, 1947, Serial No. 754,715

2 Claims. (Cl. 250—164)

This invention relates to targets for cathode ray beam pickup tubes.

In cathode ray beam pickup tubes of the orthicon type the optical image of the object being televised is focused on a target comprising a transparent sheet of insulation containing a signal plate of transparent film of metal on the entering side of the light and a light sensitive coating on the opposite side. The light produces a charge pattern over the sensitive coating that is scanned by a cathode ray beam from the gun of the tube. This construction of pickup tube is so well known that the details need not be described, but reference is made to the patent granted to Harley A. Iams, 2,213,175, August 22, 1940, for a disclosure thereof.

In the targets for the orthicon the practice has been to use a thin sheet of mica for the insulation plate which is satisfactory in most television uses that require substantially complete discharge of the charge image in each frame time. However, there are certain uses of pickup tubes in which it is necessary to provide a target capable of taking a charge image that will not be discharged in one frame time by the normal low velocity beam and that will hold the charge for an extended period. One such use is in teleran and radar systems operating with PPI (plan position indicator) scans. In general, the radar signals produce an optical image on a phosphor screen which gives directly the desired information concerning objects reflecting the signals. Each echo signal produces a bright fluorescence which disappears as soon as the signal ends but this is followed by a weak afterglow or phosphorescence that continues for a brief period. In directly viewing a PPI presentation a composite picture appears on the radar screen by an assembly of all the separate instantaneous information depicted by the phosphorescence, the phosphorescene decay period being long enough to permit this. The fluorescent flash, however, is of too brief a period to permit the assembly of the successive flashes on a composite picture and the high intensity of the flashes have not been utilized in this manner.

It is often desirable to view the composite picture at some point remote from the radar scope either on the same or a different scale. This has been done by use of a standard image orthicon pickup tube "looking" at the radar scope afterglow through a Schmidt optical system. The pickup signals are received at the distant point and are converted into an optical image by a Kinescope. This pickup system is a cumbersome setup and it has not been as satisfactory as desired. The signal to noise ratio is often quite poor. The decay time of the image reproduced at the remote point is limited to that of the radar screen which cannot be made great enough for the purpose without reducing the efficiency of the screen. The initial flashes of the radar scope can be utilized to produce a composite PPI presentation by storing the pickup target charges produced thereby. For this purpose a pickup target having a "memory" of the optical image is required. By this is meant that the charge image formed on the target must be sufficiently high to permit transmission of strong signals for a plurality of scansions before it is discharged. To accomplish this the transparent insulation plate of the target must have very high resistivity to avoid leakage and must be exceedingly thin to provide the high capacitance. Mica cannot be split thin enough to produce the capacitance required for a charge image of this magnitude. In the application of Albert Rose, filed June 14, 1947, Serial No. 754,633, a thin high resistance glass film is used for a target to produce this result and my invention is an improvement on the target disclosed therein.

It is an object of this invention to provide a pickup target of such high capacitance and resistance that charges produced by the initial flashes are fully utilized to produce a composite picture.

Another object of this invention is to obtain high storage in targets by increasing the magnitude of the charge pattern on the target sufficiently to require a large number of normal low velocity beam scansions to remove the pattern.

Another object is to provide a transparent insulator for an orthicon pickup tube that is of such extreme thinness and high resistivity that the charge image produced thereon is great enough to require a plurality of scansions by the beam for its discharge.

Another object is to provide a pickup target with an extremely thin uniform film of silica serving as the insulator between the signal plate and the photocathode.

Other objects will appear in the following specification reference being had to the drawing in which:

Fig. 1 is a sectional elevation of apparatus for forming my improved target;

Fig. 2 is a section taken on the line 2—2 of Fig. 1, certain parts being omitted;

Fig. 3 is a plan of the target viewed from the gun side as used in the cathode ray beam tube; and Fig. 4 is an enlarged section on line 4—4 through the target being broken away to reduce the size of the figure.

The method of forming the silica coating and the apparatus for carrying it out is substantially the same as that disclosed in the application of Harold B. Law, filed March 12, 1947, Serial No. 734,156. It utilizes a vacuum jar 1 having an exhaust tube 2 and an inlet tube 3 provided with a stopcock 4. The tube 2 is connected to a suitable vacuum pump and the tube 3 is connected to a suitable source (neither of which is shown) of vapor of ethyl silicate $(C_2H_5)_4 SiO_4$ which at normal temperature and pressure is a liquid but the vacuum in bottle 1 causes a copious stream of vapor to enter. A metal cylinder 5 open at both ends may rest on the bottom of jar 1 and preferably contains intermediate the ends a foraminous partition 6 to distribute the vapor evenly over the opening of the exit end of the cylinder 5. On this exit end rests a cylindrical rack 7 of some material such as glass. This rack is open at both ends and contains a plurality of pairs of supports 8, 9, 10, 11, 12 and 13 on which one may lay the object such as target disc 14 to receive the particles of silica. A highly frequency heating coil 15 may be used to produce sufficient heat in cylinder 5 to decompose the ethyl silicate with formation of silicon dioxide $(SiO_2)$. The temerature is not critical but excellent results are obtained by maintaining a temperature inside the cylinder 5 of from 900° C. to 950° C. The silica liberated at this temperature is in the form of minute or molecular silica particles of which deposit on objects as an extremely thin uniform coating as explained in said application of Harold B. Law.

The plate 14 which may be of FN (which is the symbol of a particular kind of glass sold by the Corning Glass Works) glass or of Pyrex glass both of which are known and obtainable on the market, is previously coated with a transparent conducting film to form the signal plate of the target. The conducting film 16 may be metal deposited from vapor or sputtered on the disc, but any other suitable film or coating may be used. The glass disc 14 is placed on the rod supports 8, 9, for example, with the conducting film (shown at 16 in Fig. 4) facing the open end of the cylinder 5, that is, the upper end as shown in Fig. 1. When the ethyl silicate decomposes, silica deposits on the surface of the metal film as a thin uniform adherent coating. The thickness of the silica film may be from a few wave lengths of visible light up to anything desired but for a pickup target such as I have described the silica film may be from about 0.005 mil to about 0.3 mil. The thickness may be regulated by regulating the length of time the target is exposed in the evaporation process, by regulating the heat by a control typified by rheostat 17 or by spacing the disc on racks 8 to 13 or by controlling the flow of the ethyl silicate vapor. When the desired thickness of silica film is obtained, the pump and source of ethyl silicate vapor are disconnected and the disc 14 is removed from the jar 1.

In Fig. 4 the thicknesses of the conducting film 16, silica film 18 and other parts are greatly exaggerated. A border or frame of metal 19 is formed on the conducting coating and the silica is laid down on the rectangular open area within this frame for orthogonal scansion by the beam. This metal frame may be formed by brushing a metal paint over the area to be covered. The frame may be of any configuration to expose a silica area for other types of scansion such as circular for spiral scansion, for example. The transparent photosensitive coating 20 may be silver-oxide-caesium coating or any of the other familiar types formed after the target is mounted in the tube envelope and evacuated as known in the art.

A target made in the way specified is transparent and has such high resistivity that a charge pattern will remain for several hours after removal of the light that produced it and in the partial or complete absence of the scanning beam for this time. In the continuous presence of the usual low velocity beam it may be scanned a large number of times to produce a stationary picture of a signal condition existing at any particular moment. During this time the light could be cut off after the charge is built up without materially affecting the transmitted picture.

In addition to its uses in reproducing radar scope presentations, as in Teleran or large scale reproduction systems, the improved target of high capacitance may be used in other ways than that mentioned, even in general television pickup systems where high signals are desired with complete discharge of the target in one scansion.

The signals may be taken from the signal plate or from the return beam with multiplication as in the image orthicon described in the application of Paul K. Weimer, filed Sept. 6, 1944, Serial No. 554,494 now U. S. Patent 2,433,941, Jan. 6, 1948. This is not part of the invention claimed herein and is not shown.

Various modifications of the invention may be devised without departing from the spirit of the invention.

What I claim as new is:

1. A cathode ray beam pickup target comprising a transparent plate, a transparent conducting film on one surface of said plate, a transparent silica film on said conducting film and a transparent light sensitive coating on said silica film.

2. A cathode ray beam pickup target comprising a transparent plate, a transparent conducting film on one surface of said plate, a silica film on said conducting film having a thickness of about 0.005 mil to about 0.3 mil, and a light sensitive coating on said silica film.

STANLEY V. FORGUE.

REFERENCES CITED

The following references are of record in the file of this patent:

UNITED STATES PATENTS

| Number | Name | Date |
|---|---|---|
| 2,220,964 | Knobluach et al. | Nov. 12, 1940 |
| 2,310,863 | Leverenz | Feb. 9, 1943 |
| 2,423,830 | Fonda | July 15, 1947 |